United States Patent
Zhang et al.

(10) Patent No.: US 11,166,293 B2
(45) Date of Patent: Nov. 2, 2021

(54) CBG INDICATION WITH MULTI-TTI GRANT

(71) Applicant: QUALCOMM Incorporated, San Diego, CA (US)

(72) Inventors: Xiaoxia Zhang, San Diego, CA (US); Tao Luo, San Diego, CA (US); Jing Sun, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 270 days.

(21) Appl. No.: 16/046,297

(22) Filed: Jul. 26, 2018

(65) Prior Publication Data

US 2019/0053254 A1    Feb. 14, 2019

Related U.S. Application Data

(60) Provisional application No. 62/544,376, filed on Aug. 11, 2017.

(51) Int. Cl.
*H04L 12/00* (2006.01)
*H04W 72/12* (2009.01)
(Continued)

(52) U.S. Cl.
CPC ........... *H04W 72/12* (2013.01); *H04L 1/1864* (2013.01); *H04L 1/1896* (2013.01); *H04W 72/14* (2013.01)

(58) Field of Classification Search
None
See application file for complete search history.

(56) References Cited

U.S. PATENT DOCUMENTS

2017/0208575 A1   7/2017   Chen et al.
2018/0167932 A1*  6/2018   Papasakellariou .... H04L 1/1671
(Continued)

OTHER PUBLICATIONS

Fujitsu: "Discussion on DL control signaling related to CBG based (re)transmission", 3GPP Draft; R1-1710240 CBG Harq Final, 3rd Generation Partnership Project (3GPP), Mobile Competence Centre; 650, Route Des Lucioles ; F-06921 Sophia-Antipolis Cedex; France, vel. RAN WG1, No. Qingdao, P.R. China; Jun. 27, 2017-Jun. 30, 2017Jun. 16, 2017 (Jun. 16, 2017), XP051304272, 4 pages, Retrieved from the Internet: URL: http://www.3gpp.org/ftp/tsg ran/WG1_RL1/TSGR1_AH/NR_AH_1706/Docs/ [retrieved on Jun. 16, 2017].

(Continued)

*Primary Examiner* — Noel R Beharry
*Assistant Examiner* — Lionel Preval
(74) *Attorney, Agent, or Firm* — Norton Rose Fullbright LLP

(57) ABSTRACT

Code block group (CBG) transmission indications for communications configured with multiple transmission time interval (TTI) grants is disclosed. Where multiple TTIs are configured for CBG transmission, the base station may select to signal CBG transmission indications and/or transport block (TB)-level new data indicator (NDI) for each of the configured TTIs along with an index of the TTIs that CBG transmission indicators are sent for. The base station may select to add one or more CBG transmission indications based on the predetermined payload size of the transmission indication signal of the physical downlink control channel (PDCCH).

30 Claims, 9 Drawing Sheets

(51) Int. Cl.
  *H04L 1/18* (2006.01)
  *H04W 72/14* (2009.01)

(56) References Cited

U.S. PATENT DOCUMENTS

2018/0368110 A1* 12/2018 Ying ............... H04W 72/04
2019/0158230 A1* 5/2019 Chen ............... H04L 1/1896

OTHER PUBLICATIONS

International Search Report and Written Opinion—PCT/US2018/044062—ISA/EPO—dated Oct. 11, 2018.
Samsung: "TB/CB Handling for eMBB", 3GPP Draft; R1-1700958, 3rd Generation Partnership Project (3gpp), Mobile Competence Centre ; 650, Route Des Lucioles ; F-06921 Sophia-Antipolis Cedex; France, val. RAN WG1, No. Spokane, USA; Jan. 16, 2017-Jan. 20, 2017 Jan. 16, 2017 (Jan. 16, 2017), XP051208474, 4 pages, Retrieved from the Internet: URL:http://www.3gpp.org/ftp/Meetings_3GPP_SYNC/RAN1/Docs/ [retrieved on Jan. 16, 2017].

* cited by examiner

CBG INDICATION WITH MULTI-TTI GRANT

CROSS-REFERENCE TO RELATED APPLICATIONS

This application claims the benefit of U.S. Provisional Patent Application No. 62/544,376, entitled, "CBG INDICATION WITH MULTI-TTI GRANT," filed on Aug. 11, 2017, which is expressly incorporated by reference herein in its entirety.

BACKGROUND

Field

Aspects of the present disclosure relate generally to wireless communication systems, and more particularly, to code block group (CBG) indication with a multiple transmission time interval (TTI) grant.

Background

Wireless communication networks are widely deployed to provide various communication services such as voice, video, packet data, messaging, broadcast, and the like. These wireless networks may be multiple-access networks capable of supporting multiple users by sharing the available network resources. Such networks, which are usually multiple access networks, support communications for multiple users by sharing the available network resources. One example of such a network is the Universal Terrestrial Radio Access Network (UTRAN). The UTRAN is the radio access network (RAN) defined as a part of the Universal Mobile Telecommunications System (UMTS), a third generation (3G) mobile phone technology supported by the 3rd Generation Partnership Project (3GPP). Examples of multiple-access network formats include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

A wireless communication network may include a number of base stations or node Bs that can support communication for a number of user equipments (UEs). A UE may communicate with a base station via downlink and uplink. The downlink (or forward link) refers to the communication link from the base station to the UE, and the uplink (or reverse link) refers to the communication link from the UE to the base station.

A base station may transmit data and control information on the downlink to a UE and/or may receive data and control information on the uplink from the UE. On the downlink, a transmission from the base station may encounter interference due to transmissions from neighbor base stations or from other wireless radio frequency (RF) transmitters. On the uplink, a transmission from the UE may encounter interference from uplink transmissions of other UEs communicating with the neighbor base stations or from other wireless RF transmitters. This interference may degrade performance on both the downlink and uplink.

As the demand for mobile broadband access continues to increase, the possibilities of interference and congested networks grows with more UEs accessing the long-range wireless communication networks and more short-range wireless systems being deployed in communities. Research and development continue to advance wireless technologies not only to meet the growing demand for mobile broadband access, but to advance and enhance the user experience with mobile communications.

SUMMARY

In one aspect of the disclosure, a method of wireless communication includes establishing, at a base station, a communication link with a served UE, wherein the communication link includes configuration for code block group (CBG)-level transmission and a single grant may carry assignment for a plurality of transmission time intervals (TTIs), preparing, by the base station, a transmission indication signal of predetermined length for the served UE including one of: a transmission grant or a retransmission grant for each of the plurality of TTIs, wherein the transmission indication signal includes for a corresponding TTI of the plurality of TTIs one or more of: a transport block (TB)-level new data indicator (NDI) and a CBG transmission indication, and transmitting the transmission indication signal to the served UE.

In an additional aspect of the disclosure, an apparatus configured for wireless communication includes means for establishing, at a base station, a communication link with a served UE, wherein the communication link includes configuration for CBG-level transmission and a single grant may carry assignment for a plurality of TTIs, means for preparing, by the base station, a transmission indication signal of predetermined length for the served UE including one of: a transmission grant or a retransmission grant for each of the plurality of TTIs, wherein the transmission indication signal includes for a corresponding TTI of the plurality of TTIs one or more of: a TB-level NDI and a CBG transmission indication, and means for transmitting the transmission indication signal to the served UE.

In an additional aspect of the disclosure, a non-transitory computer-readable medium having program code recorded thereon. The program code further includes code to establish, at a base station, a communication link with a served UE, wherein the communication link includes configuration for CBG-level transmission and a single grant may carry assignment for a plurality of TTIs, code to prepare, by the base station, a transmission indication signal of predetermined length for the served UE including one of: a transmission grant or a retransmission grant for each of the plurality of TTIs, wherein the transmission indication signal includes for a corresponding TTI of the plurality of TTIs one or more of: a TB-level NDI and a CBG transmission indication, and code to transmit the transmission indication signal to the served UE.

In an additional aspect of the disclosure, an apparatus configured for wireless communication is disclosed. The apparatus includes at least one processor, and a memory coupled to the processor. The processor is configured to establish, at a base station, a communication link with a served UE, wherein the communication link includes configuration for CBG-level transmission and a single grant may carry assignment for a plurality of TTIs, to prepare, by the base station, a transmission indication signal of predetermined length for the served UE including one of: a transmission grant or a retransmission grant for each of the plurality of TTIs, wherein the transmission indication signal includes for a corresponding TTI of the plurality of TTIs one or more of: a TB-level NDI and a CBG transmission indication, and to transmit the transmission indication signal to the served UE.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description, and not as a definition of the limits of the claims.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

DETAILED DESCRIPTION

Figure 1:
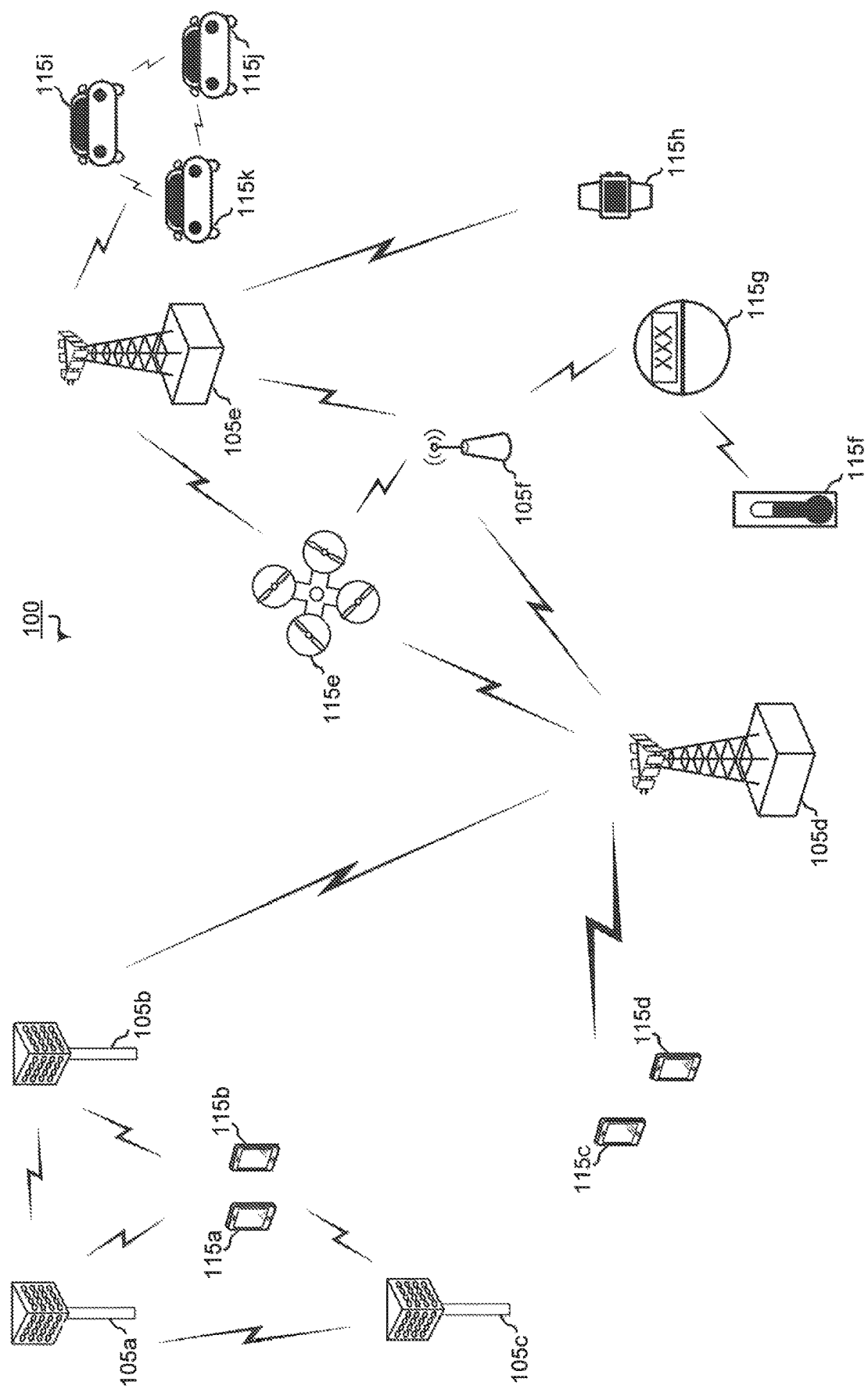
FIG. 1 is a block diagram illustrating details of a wireless communication system.

The detailed description set forth below, in connection with the appended drawings, is intended as a description of various configurations and is not intended to limit the scope of the disclosure. Rather, the detailed description includes specific details for the purpose of providing a thorough understanding of the inventive subject matter. It will be apparent to those skilled in the art that these specific details are not required in every case and that, in some instances, well-known structures and components are shown in block diagram form for clarity of presentation.

This disclosure relates generally to providing or participating in authorized shared access between two or more wireless communications systems, also referred to as wireless communications networks. In various embodiments, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, GSM networks, $5^{th}$ Generation (5G) or new radio (NR) networks, as well as other communications networks. As described herein, the terms "networks" and "systems" may be used interchangeably.

An OFDMA network may implement a radio technology such as evolved UTRA (E-UTRA), IEEE 802.11, IEEE 802.16, IEEE 802.20, flash-OFDM and the like. UTRA, E-UTRA, and Global System for Mobile Communications (GSM) are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3rd Generation Partnership Project (3GPP) is a collaboration between groups of telecommunications associations that aims to define a globally applicable third generation (3G) mobile phone specification. 3GPP long term evolution (LTE) is a 3GPP project which was aimed at improving the universal mobile telecommunications system (UMTS) mobile phone standard. The 3GPP may define specifications for the next generation of mobile networks, mobile systems, and mobile devices. The present disclosure is concerned with the evolution of wireless technologies from LTE, 4G, 5G, NR, and beyond with shared access to wireless spectrum between networks using a collection of new and different radio access technologies or radio air interfaces.

In particular, 5G networks contemplate diverse deployments, diverse spectrum, and diverse services and devices that may be implemented using an OFDM-based unified, air interface. In order to achieve these goals, further enhancements to LTE and LTE-A are considered in addition to development of the new radio technology for 5G NR networks. The 5G NR will be capable of scaling to provide coverage (1) to a massive Internet of things (IoTs) with an ultra-high density (e.g., ~1M nodes/km$^2$), ultra-low complexity (e.g., ~10s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~99.9999% reliability), ultra-low latency (e.g., ~1 ms), and users with wide ranges of mobility or lack thereof; and (3) with enhanced mobile broadband including extreme high capacity (e.g., ~10 Tbps/km$^2$), extreme data rates (e.g., multi-Gbps rate, 100+Mbps user experienced rates), and deep awareness with advanced discovery and optimizations.

The 5G NR may be implemented to use optimized OFDM-based waveforms with scalable numerology and transmission time interval (TTI); having a common, flexible framework to efficiently multiplex services and features with a dynamic, low-latency time division duplex (TDD)/frequency division duplex (FDD) design; and with advanced wireless technologies, such as massive multiple input, multiple output (MIMO), robust millimeter wave (mmWave) transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD/TDD implementations, subcarrier spacing may occur with 15 kHz, for example over 1, 5, 10, 20 MHz, and the like bandwidth. For other various outdoor and small cell coverage deployments of TDD greater than 3 GHz, subcarrier spacing may occur with 30 kHz over 80/100 MHz bandwidth. For other various indoor wideband implementations, using a TDD over the unlicensed portion of the 5 GHz band, the subcarrier spacing may occur with 60 kHz over a 160 MHz bandwidth. Finally, for various deployments transmitting with mmWave components at a TDD of 28 GHz, subcarrier spacing may occur with 120 kHz over a 500 MHz bandwidth.

The scalable numerology of the 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with uplink/downlink scheduling information, data, and acknowledgement in the same subframe. The self-contained integrated subframe supports communications in unlicensed or contention-based shared spectrum, adaptive uplink/downlink that may be flexibly configured on a per-cell basis to dynamically switch between uplink and downlink to meet the current traffic needs.

Various other aspects and features of the disclosure are further described below. It should be apparent that the teachings herein may be embodied in a wide variety of forms and that any specific structure, function, or both being disclosed herein is merely representative and not limiting. Based on the teachings herein one of an ordinary level of skill in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. For example, a method may be implemented as part of a system, device, apparatus, and/or as instructions stored on a computer readable medium for execution on a processor or computer. Furthermore, an aspect may comprise at least one element of a claim.

FIG. 1 is a block diagram illustrating 5G network 100 including various base stations and UEs configured according to aspects of the present disclosure. The 5G network 100 includes a number of base stations 105 and other network entities. A base station may be a station that communicates with the UEs and may also be referred to as an evolved node B (eNB), a next generation eNB (gNB), an access point, and the like. Each base station 105 may provide communication coverage for a particular geographic area. In 3GPP, the term "cell" can refer to this particular geographic coverage area of a base station and/or a base station subsystem serving the coverage area, depending on the context in which the term is used.

A base station may provide communication coverage for a macro cell or a small cell, such as a pico cell or a femto cell, and/or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A base station for a macro cell may be referred to as a macro base station. A base station for a small cell may be referred to as a small cell base station, a pico base station, a femto base station or a home base station. In the example shown in FIG. 1, the base stations 105d and 105e are regular macro base stations, while base stations 105a-105c are macro base stations enabled with one of 3 dimension (3D), full dimension (ED), or massive MIMO. Base stations 105a-105c take advantage of their higher dimension MIMO capabilities to exploit 3D beamforming in both elevation and azimuth beamforming to increase coverage and capacity. Base station 105f is a small cell base station which may be a home node or portable access point. A base station may support one or multiple (e.g., two, three, four, and the like) cells.

The 5G network 100 may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time.

The UEs 115 are dispersed throughout the wireless network 100, and each UE may be stationary or mobile. A UE may also be referred to as a terminal, a mobile station, a subscriber unit, a station, or the like. A UE may be a cellular phone, a personal digital assistant (PDA), a wireless modem, a wireless communication device, a handheld device, a tablet computer, a laptop computer, a cordless phone, a wireless local loop (WLL) station, or the like. In one aspect, a UE may be a device that includes a Universal Integrated Circuit Card (UICC). In another aspect, a UE may be a device that does not include a UICC. In some aspects, UEs that do not include UICCs may also be referred to as internet of everything (IoE) devices. UEs 115a-115d are examples of mobile smart phone-type devices accessing 5G network 100 A UE may also be a machine specifically configured for connected communication, including machine type communication (MTC), enhanced MTC (eMTC), narrowband IoT (NB-IoT) and the like. UEs 115e-115k are examples of various machines configured for communication that access 5G network 100. A UE may be able to communicate with any type of the base stations, whether macro base station, small cell, or the like. In FIG. 1, a lightning bolt (e.g., communication links) indicates wireless transmissions between a UE and a serving base station, which is a base station designated to serve the UE on the downlink and/or uplink, or desired transmission between base stations, and backhaul transmissions between base stations.

In operation at 5G network 100, base stations 105a-105c serve UEs 115a and 115b using 3D beamforming and coordinated spatial techniques, such as coordinated multipoint (CoMP) or multi-connectivity. Macro base station 105d performs backhaul communications with base stations 105a-105c, as well as small cell, base station 105f. Macro base station 105d also transmits multicast services which are subscribed to and received by UEs 115c and 115d. Such multicast services may include mobile television or stream video, or may include other services for providing community information, such as weather emergencies or alerts, such as Amber alerts or gray alerts.

5G network 100 also support mission critical communications with ultra-reliable and redundant links for mission critical devices, such UE 115e, which is a drone. Redundant communication links with UE 115e include from macro base stations 105d and 105e, as well as small cell base station 105f. Other machine type devices, such as UE 115f (thermometer), UE 115g (smart meter), and UE 115h (wearable device) may communicate through 5G network 100 either directly with base stations, such as small cell base station 105f, and macro base station 105e, or in multi-hop configurations by communicating with another user device which relays its information to the network, such as UE 115f communicating temperature measurement information to the smart meter, UE 115g, which is then reported to the network through small cell base station 105f. 5G network 100 may also provide additional network efficiency through dynamic, low-latency TDD/FDD communications, such as in a vehicle-to-vehicle (V2V) mesh network between UEs 115i-115k communicating with macro base station 105e.

Figure 2:
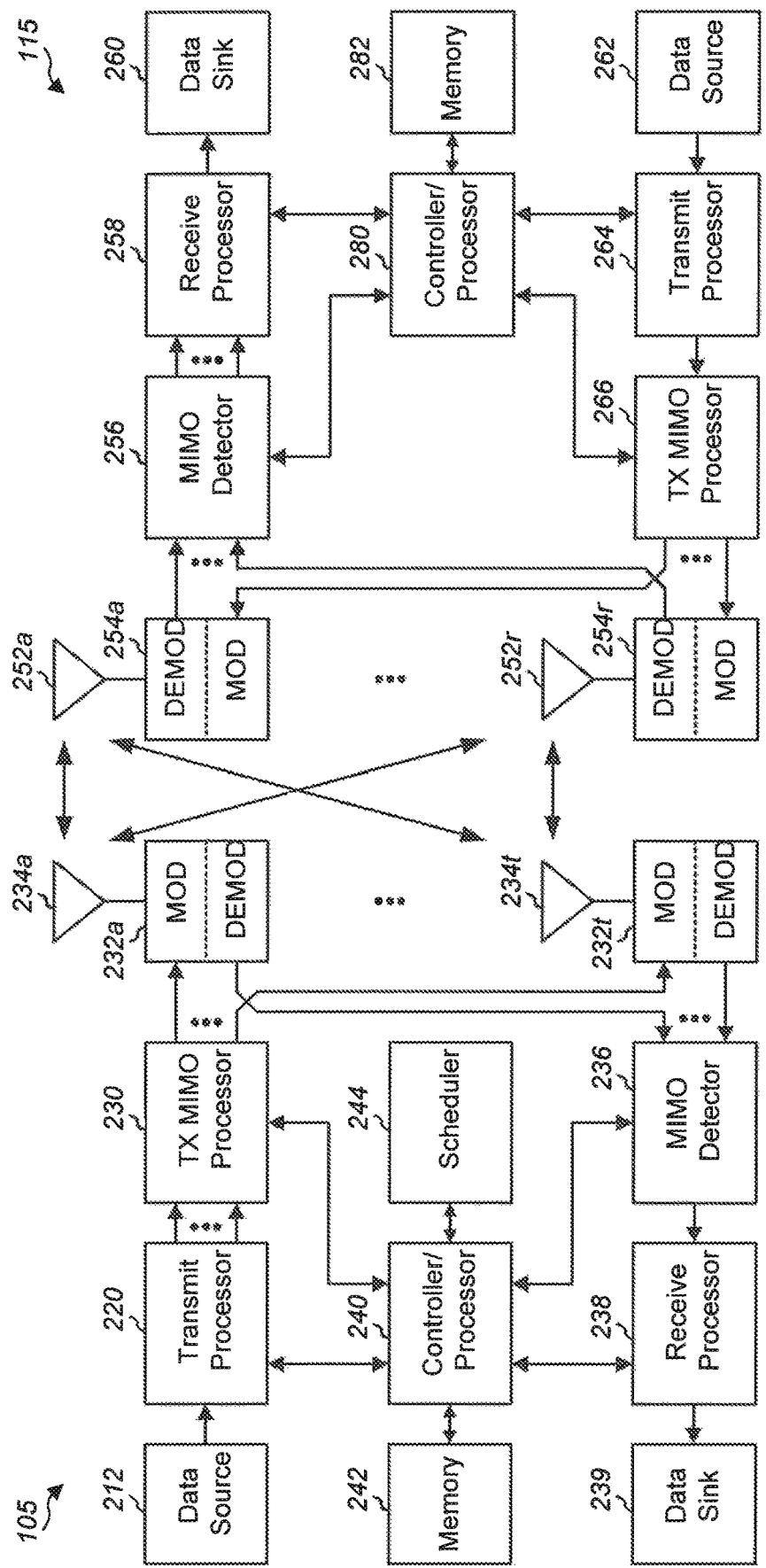
FIG. 2 is a block diagram illustrating a design of a base station and a UE configured according to one aspect of the present disclosure.

FIG. 2 shows a block diagram of a design of a base station 105 and a UE 115, which may be one of the base station and one of the UEs in FIG. 1. At the base station 105, a transmit processor 220 may receive data from a data source 212 and control information from a controller/processor 240. The control information may be for the PBCH, PCFICH, PHICH, PDCCH, EPDCCH, MPDCCH etc. The data may be for the PDSCH, etc. The transmit processor 220 may process (e.g., encode and symbol map) the data and control information to obtain data symbols and control symbols, respectively. The transmit processor 220 may also generate reference symbols, e.g., for the PSS, SSS, and cell-specific reference signal. A transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) 232a through 232t. Each modulator 232 may process a respective output symbol stream (e.g., for OFDM, etc.) to obtain an output sample stream. Each modulator 232 may further process (e.g., convert to analog, amplify, filter, and upconvert) the output sample stream to obtain a downlink signal. Downlink signals from modulators 232a through 232t may be transmitted via the antennas 234a through 234t, respectively.

At the UE 115, the antennas 252a through 252r may receive the downlink signals from the base station 105 and may provide received signals to the demodulators (DEMODs) 254a through 254r, respectively. Each demodulator 254 may condition (e.g., filter, amplify, downconvert, and digitize) a respective received signal to obtain input samples. Each demodulator 254 may further process the input samples (e.g., for OFDM, etc.) to obtain received symbols. A MIMO detector 256 may obtain received symbols from all the demodulators 254a through 254r, perform MIMO detection on the received symbols if applicable, and provide detected symbols. A receive processor 258 may process (e.g., demodulate, deinterleave, and decode) the detected symbols, provide decoded data for the UE 115 to a data sink 260, and provide decoded control information to a controller/processor 280.

On the uplink, at the UE 115, a transmit processor 264 may receive and process data (e.g., for the PUSCH) from a data source 262 and control information (e.g., for the PUCCH) from the controller/processor 280. The transmit processor 264 may also generate reference symbols for a reference signal. The symbols from the transmit processor 264 may be precoded by a TX MIMO processor 266 if applicable, further processed by the modulators 254a through 254r (e.g., for SC-FDM, etc.), and transmitted to the base station 105. At the base station 105, the uplink signals from the UE 115 may be received by the antennas 234, processed by the demodulators 232, detected by a MIMO detector 236 if applicable, and further processed by a receive processor 238 to obtain decoded data and control information sent by the UE 115. The processor 238 may provide the decoded data to a data sink 239 and the decoded control information to the controller/processor 240.

The controllers/processors 240 and 280 may direct the operation at the base station 105 and the UE 115, respectively. The controller/processor 240 and/or other processors and modules at the base station 105 may perform or direct the execution of various processes for the techniques described herein. The controllers/processor 280 and/or other processors and modules at the UE 115 may also perform or direct the execution of the functional blocks illustrated in FIG. 5, and/or other processes for the techniques described herein. The memories 242 and 282 may store data and program codes for the base station 105 and the UE 115, respectively. A scheduler 244 may schedule UEs for data transmission on the downlink and/or uplink.

Wireless communications systems operated by different network operating entities (e.g., network operators) may share spectrum. In some instances, a network operating entity may be configured to use an entirety of a designated shared spectrum for at least a period of time before another network operating entity uses the entirety of the designated shared spectrum for a different period of time. Thus, in order to allow network operating entities use of the full designated shared spectrum, and in order to mitigate interfering communications between the different network operating entities, certain resources (e.g., time) may be partitioned and allocated to the different network operating entities for certain types of communication.

For example, a network operating entity may be allocated certain time resources reserved for exclusive communication by the network operating entity using the entirety of the shared spectrum. The network operating entity may also be allocated other time resources where the entity is given priority over other network operating entities to communicate using the shared spectrum. These time resources, prioritized for use by the network operating entity, may be utilized by other network operating entities on an opportunistic basis if the prioritized network operating entity does not utilize the resources. Additional time resources may be allocated for any network operator to use on an opportunistic basis.

Access to the shared spectrum and the arbitration of time resources among different network operating entities may be centrally controlled by a separate entity, autonomously determined by a predefined arbitration scheme, or dynamically determined based on interactions between wireless nodes of the network operators.

In some cases, UE 115 and base station 105 may operate in a shared radio frequency spectrum band, which may include licensed or unlicensed (e.g., contention-based) frequency spectrum. In an unlicensed frequency portion of the shared radio frequency spectrum band, UEs 115 or base stations 105 may traditionally perform a medium-sensing procedure to contend for access to the frequency spectrum. For example, UE 115 or base station 105 may perform a listen before talk (LBT) procedure such as a clear channel assessment (CCA) prior to communicating in order to determine whether the shared channel is available. A CCA may include an energy detection procedure to determine whether there are any other active transmissions. For example, a device may infer that a change in a received signal strength indicator (RSSI) of a power meter indicates that a channel is occupied. Specifically, signal power that is concentrated in a certain bandwidth and exceeds a predetermined noise floor may indicate another wireless transmitter. A CCA also may include detection of specific sequences that indicate use of the channel. For example, another device may transmit a specific preamble prior to transmitting a data sequence. In some cases, an LBT procedure may include a wireless node adjusting its own backoff window based on the amount of energy detected on a channel and/or the acknowledge/negative-acknowledge (ACK/NACK) feedback for its own transmitted packets as a proxy for collisions.

Use of a medium-sensing procedure to contend for access to an unlicensed shared spectrum may result in communication inefficiencies. This may be particularly evident when multiple network operating entities (e.g., network operators) are attempting to access a shared resource. In 5G network 100, base stations 105 and UEs 115 may be operated by the same or different network operating entities. In some examples, an individual base station 105 or UE 115 may be operated by more than one network operating entity. In other examples, each base station 105 and UE 115 may be operated by a single network operating entity. Requiring each base station 105 and UE 115 of different network operating entities to contend for shared resources may result in increased signaling overhead and communication latency.

Figure 3:
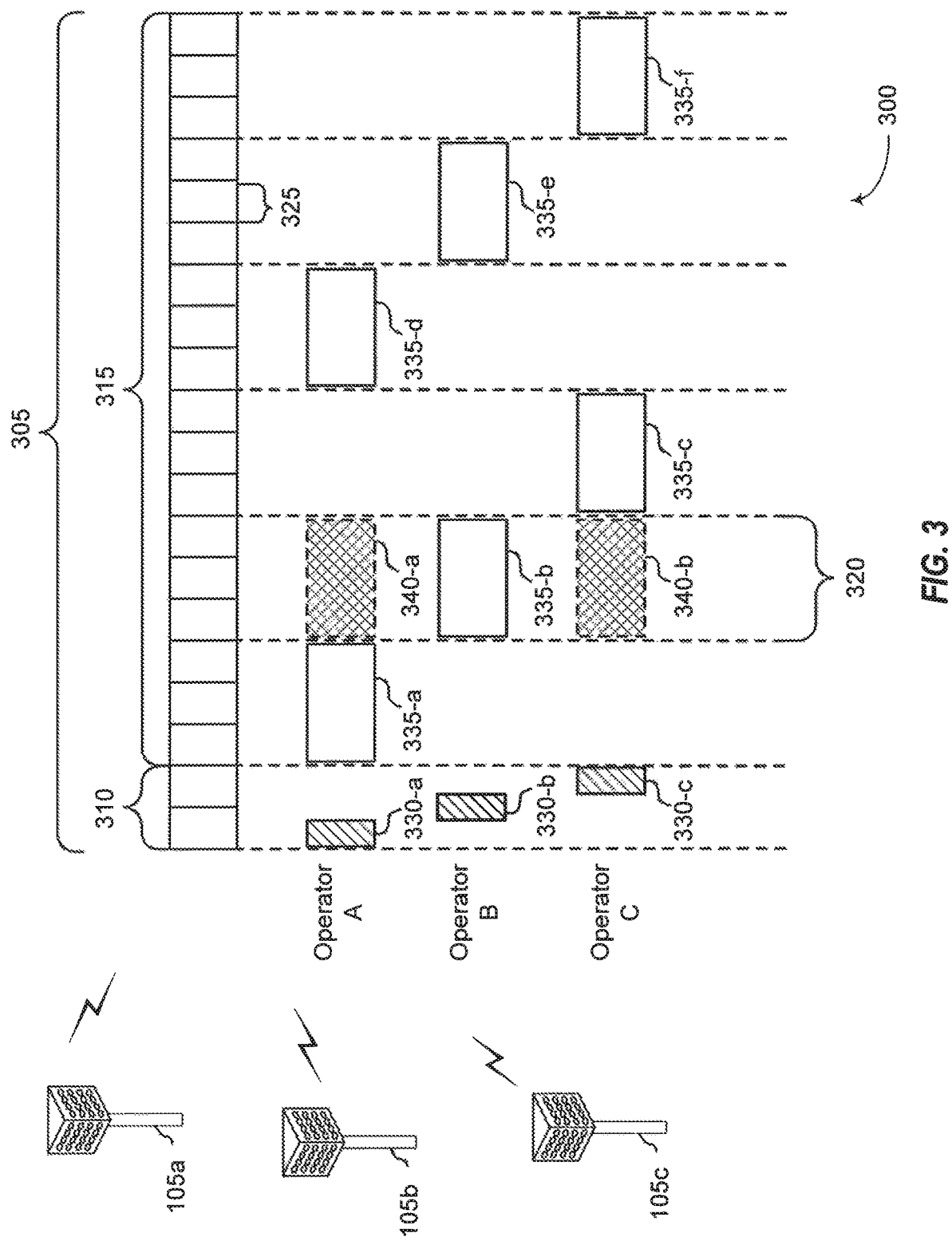
FIG. 3 is a block diagram illustrating a wireless communication system including base stations that use directional wireless beams.

FIG. 3 illustrates an example of a timing diagram 300 for coordinated resource partitioning. The timing diagram 300 includes a superframe 305, which may represent a fixed duration of time (e.g., 20 ms). Superframe 305 may be repeated for a given communication session and may be used by a wireless system such as 5G network 100 described with reference to FIG. 1. The superframe 305 may be divided into intervals such as an acquisition interval (A-INT) 310 and an arbitration interval 315. As described in more detail below, the A-INT 310 and arbitration interval 315 may be subdivided into sub-intervals, designated for certain resource types, and allocated to different network operating entities to facilitate coordinated communications between the different network operating entities. For example, the arbitration interval 315 may be divided into a plurality of sub-intervals 320. Also, the superframe 305 may be further divided into a plurality of subframes 325 with a fixed duration (e.g., 1 ms). While timing diagram 300 illustrates three different network operating entities (e.g., Operator A, Operator B, Operator C), the number of network operating entities using the superframe 305 for coordinated communications may be greater than or fewer than the number illustrated in timing diagram 300.

The A-INT 310 may be a dedicated interval of the superframe 305 that is reserved for exclusive communications by the network operating entities. In some examples, each network operating entity may be allocated certain resources within the A-INT 310 for exclusive communications. For example, resources 330-a may be reserved for exclusive communications by Operator A, such as through base station 105a, resources 330-b may be reserved for exclusive communications by Operator B, such as through base station 105b, and resources 330-c may be reserved for exclusive communications by Operator C, such as through base station 105c. Since the resources 330-a are reserved for exclusive communications by Operator A, neither Operator B nor Operator C can communicate during resources 330-a, even if Operator A chooses not to communicate during those resources. That is, access to exclusive resources is limited to the designated network operator. Similar restrictions apply to resources 330-b for Operator B and resources 330-c for Operator C. The wireless nodes of Operator A (e.g., UEs 115 or base stations 105) may communicate any information desired during their exclusive resources 330-a, such as control information or data.

When communicating over an exclusive resource, a network operating entity does not need to perform any medium sensing procedures (e.g., listen-before-talk (LBT) or clear channel assessment (CCA)) because the network operating entity knows that the resources are reserved. Because only the designated network operating entity may communicate over exclusive resources, there may be a reduced likelihood of interfering communications as compared to relying on medium sensing techniques alone (e.g., no hidden node problem). In some examples, the A-INT 310 is used to transmit control information, such as synchronization signals (e.g., SYNC signals), system information (e.g., system information blocks (SIBs)), paging information (e.g., physical broadcast channel (PBCH) messages), or random access information (e.g., random access channel (RACH) signals). In some examples, all of the wireless nodes associated with a network operating entity may transmit at the same time during their exclusive resources.

In some examples, resources may be classified as prioritized for certain network operating entities. Resources that are assigned with priority for a certain network operating entity may be referred to as a guaranteed interval (G-INT) for that network operating entity. The interval of resources used by the network operating entity during the G-INT may be referred to as a prioritized sub-interval. For example, resources 335-a may be prioritized for use by Operator A and may therefore be referred to as a G-INT for Operator A (e.g., G-INT-OpA). Similarly, resources 335-b may be prioritized for Operator B, resources 335-c may be prioritized for Operator C, resources 335-d may be prioritized for Operator A, resources 335-e may be prioritized for Operator B, and resources 335-f may be prioritized for operator C.

The various G-INT resources illustrated in FIG. 3 appear to be staggered to illustrate their association with their respective network operating entities, but these resources may all be on the same frequency bandwidth. Thus, if viewed along a time-frequency grid, the G-INT resources may appear as a contiguous line within the superframe 305. This partitioning of data may be an example of time division multiplexing (TDM). Also, when resources appear in the same sub-interval (e.g., resources 340-a and resources 335-b), these resources represent the same time resources with respect to the superframe 305 (e.g., the resources occupy the same sub-interval 320), but the resources are separately designated to illustrate that the same time resources can be classified differently for different operators.

When resources are assigned with priority for a certain network operating entity (e.g., a G-INT), that network operating entity may communicate using those resources without having to wait or perform any medium sensing procedures (e.g., LBT or CCA). For example, the wireless nodes of Operator A are free to communicate any data or control information during resources 335-*a* without interference from the wireless nodes of Operator B or Operator C.

A network operating entity may additionally signal to another operator that it intends to use a particular G-INT. For example, referring to resources 335-*a*, Operator A may signal to Operator B and Operator C that it intends to use resources 335-*a*. Such signaling may be referred to as an activity indication. Moreover, since Operator A has priority over resources 335-*a*, Operator A may be considered as a higher priority operator than both Operator B and Operator C. However, as discussed above, Operator A does not have to send signaling to the other network operating entities to ensure interference-free transmission during resources 335-*a* because the resources 335-*a* are assigned with priority to Operator A.

Similarly, a network operating entity may signal to another network operating entity that it intends not to use a particular G-INT. This signaling may also be referred to as an activity indication. For example, referring to resources 335-*b*, Operator B may signal to Operator A and Operator C that it intends not to use the resources 335-*b* for communication, even though the resources are assigned with priority to Operator B. With reference to resources 335-*b*, Operator B may be considered a higher priority network operating entity than Operator A and Operator C. In such cases, Operators A and C may attempt to use resources of sub-interval 320 on an opportunistic basis. Thus, from the perspective of Operator A, the sub-interval 320 that contains resources 335-*b* may be considered an opportunistic interval (O-INT) for Operator A (e.g., O-INT-OpA). For illustrative purposes, resources 340-*a* may represent the O-INT for Operator A. Also, from the perspective of Operator C, the same sub-interval 320 may represent an O-INT for Operator C with corresponding resources 340-*b*. Resources 340-*a*, 335-*b*, and 340-*b* all represent the same time resources (e.g., a particular sub-interval 320), but are identified separately to signify that the same resources may be considered as a G-INT for some network operating entities and yet as an O-INT for others.

To utilize resources on an opportunistic basis, Operator A and Operator C may perform medium-sensing procedures to check for communications on a particular channel before transmitting data. For example, if Operator B decides not to use resources 335-*b* (e.g., G-INT-OpB), then Operator A may use those same resources (e.g., represented by resources 340-*a*) by first checking the channel for interference (e.g., LBT) and then transmitting data if the channel was determined to be clear. Similarly, if Operator C wanted to access resources on an opportunistic basis during sub-interval 320 (e.g., use an O-INT represented by resources 340-*b*) in response to an indication that Operator B was not going to use its G-INT, Operator C may perform a medium sensing procedure and access the resources if available. In some cases, two operators (e.g., Operator A and Operator C) may attempt to access the same resources, in which case the operators may employ contention-based procedures to avoid interfering communications. The operators may also have sub-priorities assigned to them designed to determine which operator may gain access to resources if more than operator is attempting access simultaneously.

In some examples, a network operating entity may intend not to use a particular G-INT assigned to it, but may not send out an activity indication that conveys the intent not to use the resources. In such cases, for a particular sub-interval 320, lower priority operating entities may be configured to monitor the channel to determine whether a higher priority operating entity is using the resources. If a lower priority operating entity determines through LBT or similar method that a higher priority operating entity is not going to use its G-INT resources, then the lower priority operating entities may attempt to access the resources on an opportunistic basis as described above.

In some examples, access to a G-INT or O-INT may be preceded by a reservation signal (e.g., request-to-send (RTS)/clear-to-send (CTS)), and the contention window (CW) may be randomly chosen between one and the total number of operating entities.

In some examples, an operating entity may employ or be compatible with coordinated multipoint (CoMP) communications. For example an operating entity may employ CoMP and dynamic time division duplex (TDD) in a G-INT and opportunistic CoMP in an O-INT as needed.

In the example illustrated in FIG. 3, each sub-interval 320 includes a G-INT for one of Operator A, B, or C. However, in some cases, one or more sub-intervals 320 may include resources that are neither reserved for exclusive use nor reserved for prioritized use (e.g., unassigned resources). Such unassigned resources may be considered an O-INT for any network operating entity, and may be accessed on an opportunistic basis as described above.

In some examples, each subframe 325 may contain 14 symbols (e.g., 250-μs for 60 kHz tone spacing). These subframes 325 may be standalone, self-contained Interval-Cs (ITCs) or the subframes 325 may be a part of a long ITC. An ITC may be a self-contained transmission starting with a downlink transmission and ending with a uplink transmission. In some embodiments, an ITC may contain one or more subframes 325 operating contiguously upon medium occupation. In some cases, there may be a maximum of eight network operators in an A-INT 310 (e.g., with duration of 2 ms) assuming a 250-μs transmission opportunity.

Although three operators are illustrated in FIG. 3, it should be understood that fewer or more network operating entities may be configured to operate in a coordinated manner as described above. In some cases, the location of the G-INT, O-INT, or A-INT within superframe 305 for each operator is determined autonomously based on the number of network operating entities active in a system. For example, if there is only one network operating entity, each sub-interval 320 may be occupied by a G-INT for that single network operating entity, or the sub-intervals 320 may alternate between G-INTs for that network operating entity and O-INTs to allow other network operating entities to enter. If there are two network operating entities, the sub-intervals 320 may alternate between G-INTs for the first network operating entity and G-INTs for the second network operating entity. If there are three network operating entities, the G-INT and O-INTs for each network operating entity may be designed as illustrated in FIG. 3. If there are four network operating entities, the first four sub-intervals 320 may include consecutive G-INTs for the four network operating entities and the remaining two sub-intervals 320 may contain O-INTs. Similarly, if there are five network operating entities, the first five sub-intervals 320 may contain consecutive G-INTs for the five network operating entities and the remaining sub-interval 320 may contain an O-INT. If there are six network operating entities, all six sub-intervals 320 may include consecutive G-INTs for each network operating entity. It should be understood that these examples are for illustrative purposes only and that other autonomously determined interval allocations may be used.

It should be understood that the coordination framework described with reference to FIG. 3 is for illustration purposes only. For example, the duration of superframe 305 may be more or less than 20 ms. Also, the number, duration, and location of sub-intervals 320 and subframes 325 may differ from the configuration illustrated. Also, the types of resource designations (e.g., exclusive, prioritized, unassigned) may differ or include more or less sub-designations.

NR networks may support code block group (CBG)-level acknowledgement feedback (e.g., ACK/NAK) for downlink transmission and CBG-based (re)transmission in both downlink and uplink transmission. A number of code blocks (CBs) may be configured for each CBG (e.g., 1-5 CBs per CBG). When CBG-based (re)transmission is configured, the PDCCH may indicate which CBG(s) of a transport block (TB) are to be retransmitted. This indication by the PDCCH may explicitly signal which CBG is to be retransmitted. For example, a CBG transmission indication bitmap may be included in the PDCCH which identifies which CBG are to be retransmitted, though, further compression schemes applied to the CBG transmission indication may be provided.

Such a CBG transmission indication field may be present for both initial transmission grants and retransmission grants. This may help to avoid blind detection on UE receiver processing as long as CBG-based (re)transmission is configured. The CBG transmission indication is not needed for initial transmission. However, keeping it in both the initial and retransmission grants allows less processing in the UE by avoiding blind detection.

NR networks may also support multiple transmission time interval (TTI) scheduling. As such, a single TB or multiple TBs could be scheduled by a single grant using multi-TTI bundling. Issues may arise, however, in determining how to send the CBG transmission indication with a multi-TTI grant having multiple TBs, as each TB, which corresponds to a TTI, may have multiple CBGs. Therefore, the CBG transmission indication field would linearly increase with the number of TBs, and with it the required payload size for such CBG transmission indication field.

Figure 4:
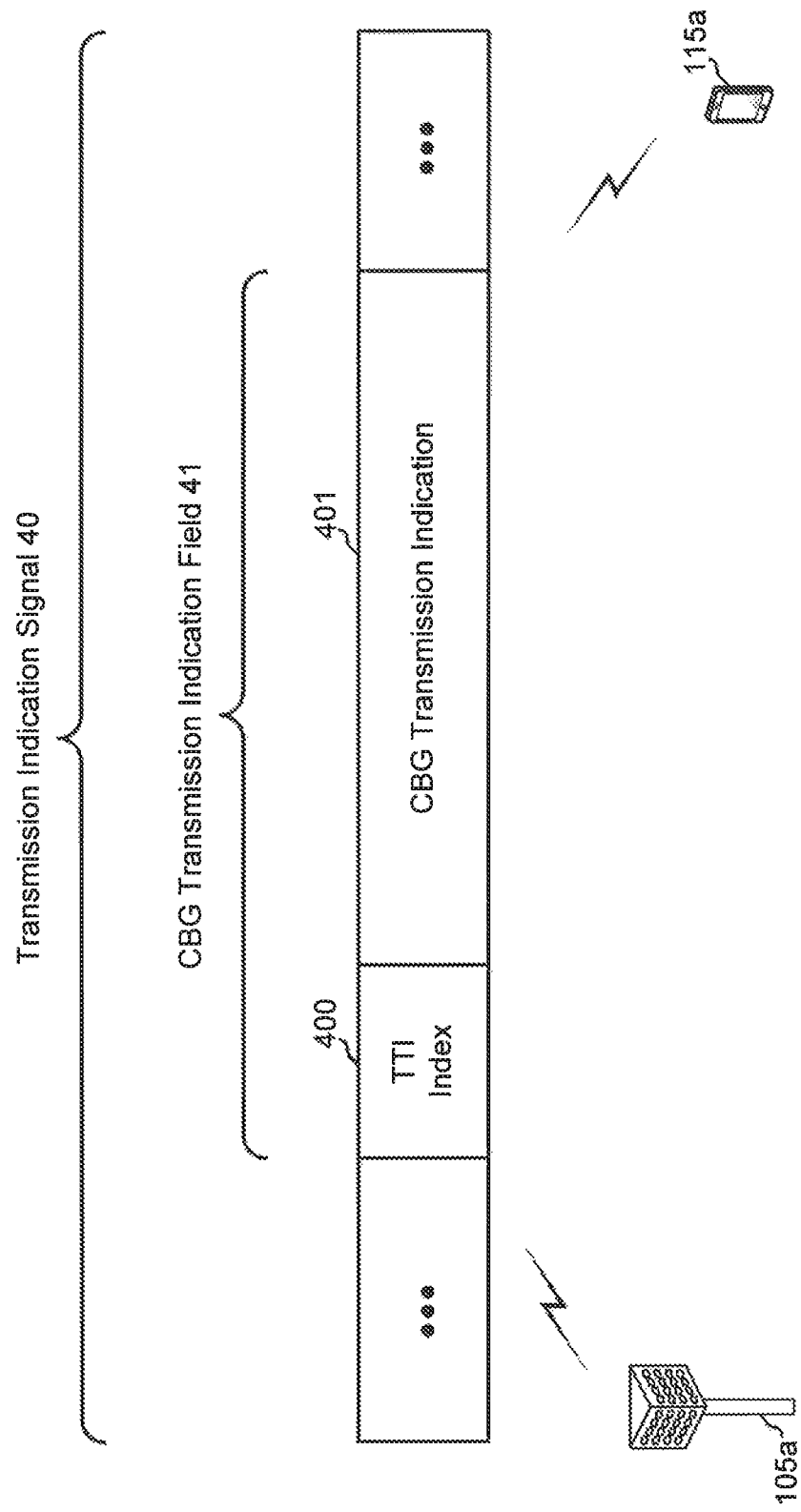
FIG. 4 is a block diagram illustrating a base station and UE configured according to one aspect of the present disclosure.

FIG. 4 is a block diagram illustrating a base station 105a and UE 115a configured according to one aspect of the present disclosure. With multi-TTIs configured for communication between base station 105a and UE 115a and one or more of those TTIs configured for CBG transmissions, a transmission indication signal 40 includes CBG transmission indication field 41. Various aspects of the present disclosure provide for a predetermined or preconfigured size for transmission indication signal 40 of the PDCCH and would, at least, include enough payload to cover a TB-level new data indicator (NDI) for each TB of the PDCCH. CBG transmission indication field 41 further includes TTI index 400 of a length depending on the preconfigured TTI bundling size. CBG transmission indication field 41 further includes CBG transmission indication 401 of a length depending on how many CBGs are configured for this TTI. For an indication of TI index 400 with CBG transmission indication 401, UE 115a and base station 105a generally know the preconfigured TTI bundling size. CBG transmission indication field 41 in transmission indication signal 40 includes TTI index 400 of the TTI followed by CBG transmission indication 401 for that TTI, each having a known length. Thus, it may be possible to carry a CBG transmission indication for multiple TTIs when space allows. Thus, the payload size of transmission indication signal 40 may be a function of the number of aggregated/bundled slots and the CBG size.

Figure 5:
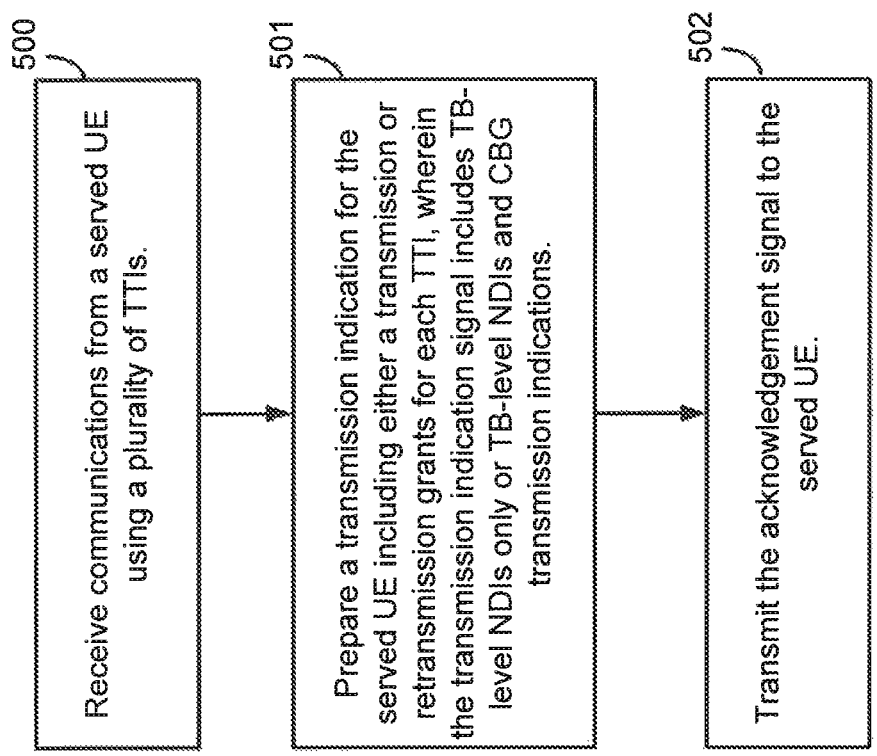
FIG. 5 is a block diagram illustrating example blocks executed to implement one aspect of the present disclosure.
Figure 9:
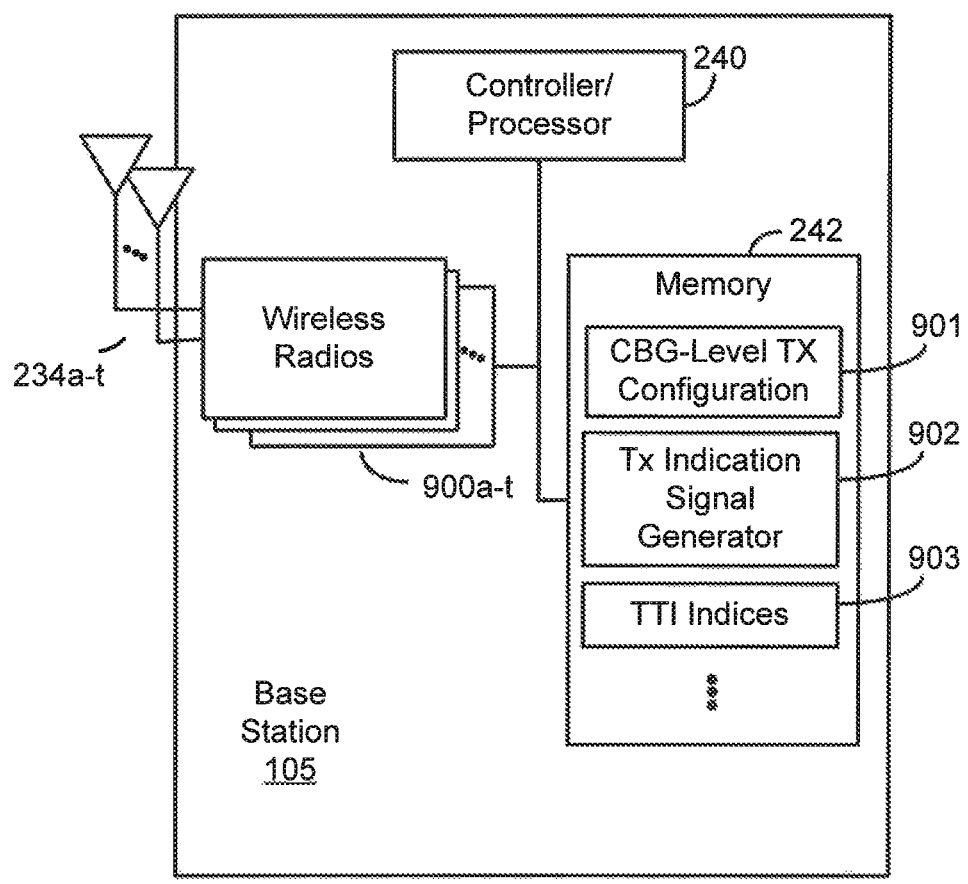
FIG. 9 is a block diagram illustrating example details of a base station configured according to one aspect of the present disclosure.

FIG. 5 is a block diagram illustrating example blocks executed to implement one aspect of the present disclosure. The example blocks will also be described with respect to base station 105 as illustrated in FIG. 9. FIG. 9 is a block diagram illustrating base station 105 configured according to one aspect of the present disclosure. Base station 105 includes the structure, hardware, and components as illustrated for base station 105 of FIG. 2. For example, base station 105 includes controller/processor 240, which operates to execute logic or computer instructions stored in memory 242, as well as controlling the components of base station 105 that provide the features and functionality of base station 105. Base station 105, under control of controller/processor 240, transmits and receives signals via wireless radios 800a-t and antennas 234a-t. Wireless radios 800a-t includes various components and hardware, as illustrated in FIG. 2 for base station 105, including modulator/demodulators 232a-t, MIMO detector 236, receive processor 238, transmit processor 220, and TX MIMO processor 230.

At block 500, a base station receives communications from a served UE using a plurality of TTIs. For example, base station 105 and the served UE (not shown) are configured for CBG-level transmission and a multi-TTI grant. The configuration information is stored at CBG-level transmission configuration 901, stored in memory 242 and the multi-TTI grant stores indices of the granted TTIs at TTI indices 903. In establishing the communication link with the served UE, base station 105 may determine transmission indication information which may indicate retransmission of certain communications, whether at the TB-level or the CBG-level, further transmissions of new data or both.

At block 501, the base station prepares a transmission indication signal for the served UE including either or both of transmission and retransmission grants for each TTI, wherein the transmission indication signal includes TB-level NDIs only or TB-level NDIs and CBG transmission indications. Among the multiple TTIs with CBG transmission configured, base station 105, under control of controller/processor 240, executes transmission indicator signal generator 902, stored in memory 242. The execution environment of transmission indication signal generator 902 provides functionality for base station 105 to choose to use either the CBG transmission indication, for TTIs identified as being configured for CBG-level transmission, as identified in CBG-level transmission configuration 901, or the TB-level NDI indication for each TTI. If there is not enough space in the predetermined PDCCH size, then base station 105 may select to transmit the TB-level NDI only, as a lossy compression scheme. Base station 105 can choose a subset of TTIs to prepare the CBG transmission indication for, such as those that reflect code blocks experiencing a bursty interference or error pattern. For example, if base station 105 experiences several failed CBG transmissions in one TTI but fewer failed CBG transmissions in another TTI, base station 105, under the functionality available within the execution environment of transmission indication signal generator 902, may choose to retransmit the entire TB with the one TTI and apply CBG-based transmission in another TTI when the available payload of the PDCCH can only afford to indicate CBG transmission for one TTI.

When CBG transmission indications are added, aspects of the present disclosure may also add a TTI index, as identified at TTI indices 903, in memory 242, to the transmission indication signal for each of the corresponding TTIs for which a CBG transmission indication is included in the transmission indication signal. The TTI index, from TTI indices 903, in the transmission indication signal identifies to the UE which of the CBG-level transmissions should be retransmitted by the UE. Within the PDCCH, base station 105 may indicate which TTI will be associated with a CBG transmission indication and only include the CBG transmission indications for those TTIs. In this way, the PDCCH overhead can be maintained without linearly growing the slot/TTI bundling size.

At block 502, the base station transmits the transmission indication signal to the served UE. Once base station 105 has generated the transmission indication signal to include the determined TB-level NDI and any CBG transmission indications and associated TTI indices, base station 105 will transmit the transmission indication signal with the PDCCH to the served UE using wireless radios 900a-t and antennas 234a-t.

Figure 6:
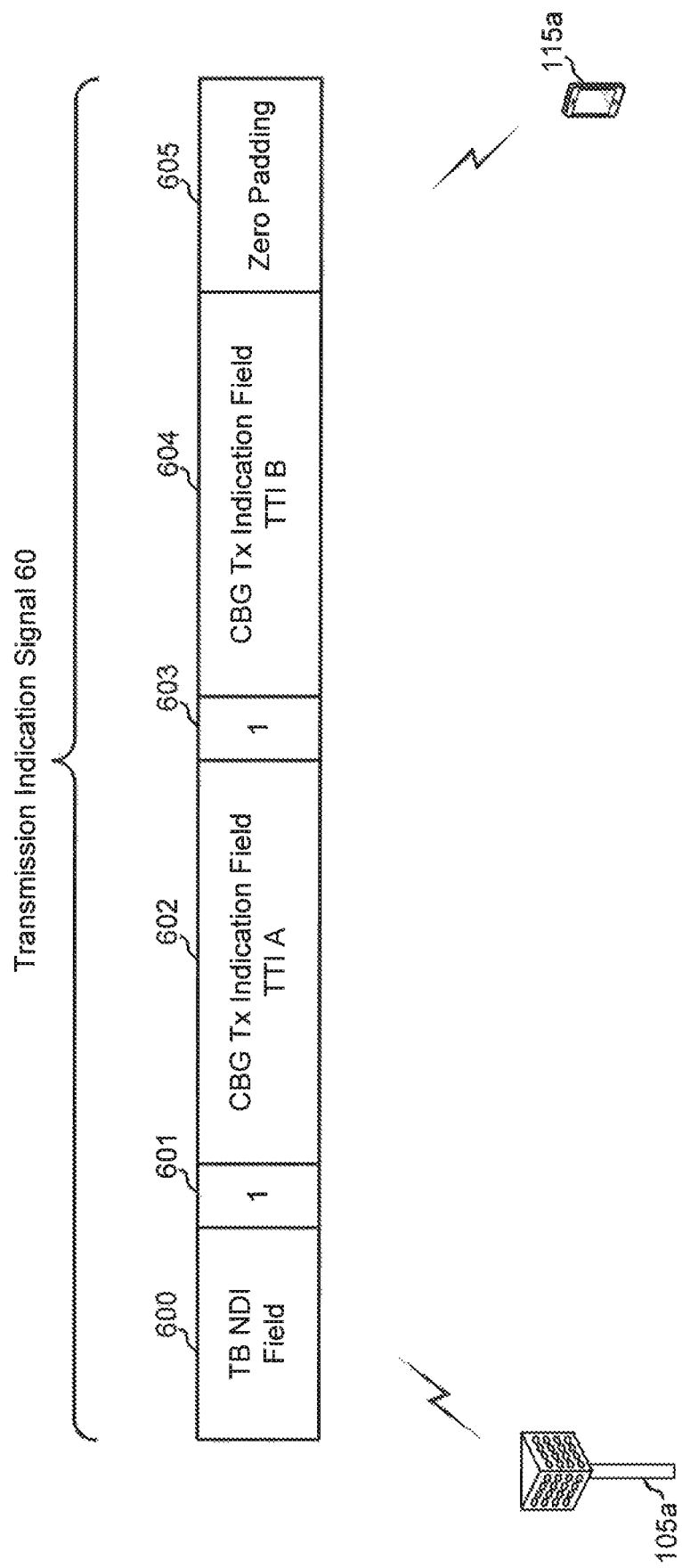
FIG. 6 is a block diagram illustrating a base station and UE configured according to one aspect of the present disclosure.

FIG. 6 is a block diagram illustrating a base station 105a and UE 115a configured according to one aspect of the present disclosure. Base station 105a and UE 115a are configured to communicate using CBG-level transmissions and multi-TTI grant. When the available bits of the transmission indication signal exceed a predetermined threshold, the base station may include multiple CBG transmission indications along with TB-level NDI. For example, transmission indication signal 60 includes TB NDI field 600 for the TB-level NDI identified by base station 105a, and two sequentially concatenated CBG transmission indications in CBG transmission indication field 602 for TTI A and CBG transmission indication field 604 for TTA B. The length of TB NDI field 600 may also follow the preconfigured TTI bundling size. The organization of the fields in the payload of transmission indication signal 60 may be configured similarly to a packet design. There may further be configuration of bits to indicate the availability of the various optional fields. For example, in the example aspect of FIG. 6, identification information bits 601 and 603 provide a field identifier, which with the '1' value indicated, identifies to UE 115a that the next field in transmission indication signal 60 is a CBG transmission indication field.

Any remaining bits in the payload of transmission indication signal 60 can be filled using zero padding 605 to avoid blind detection at the UE. When the bits included in TB NDI field 600, CBG transmission indication fields 602 and 603 for TTI A and B, respectively, as well as identification information bits 601 and 603, fail to fill the predefined payload size of transmission indication signal 60, and there are not enough unused bits to add another CBG transmission indication for another TTI, zero padding 605 is added to fill the payload size.

Figure 7:
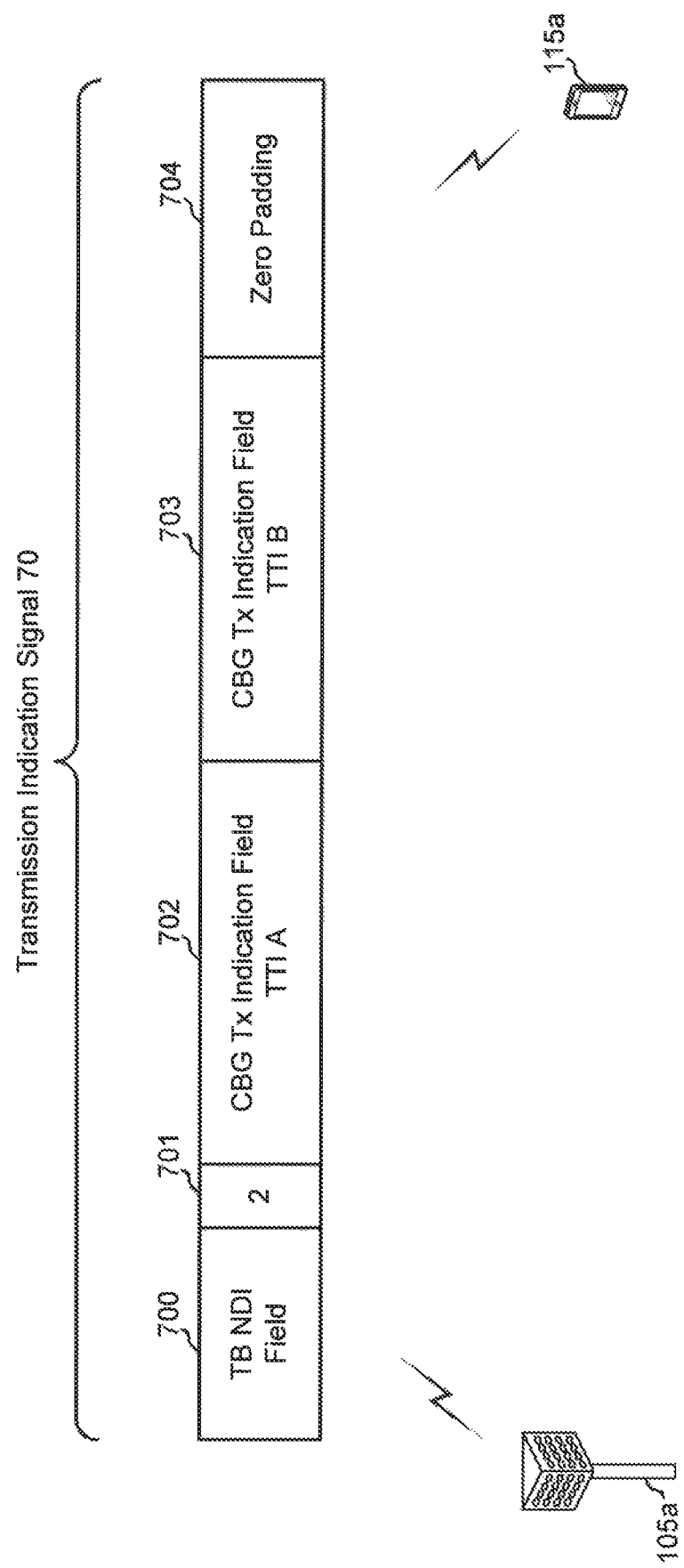
FIG. 7 is a block diagram illustrating a base station and UE configured according to one aspect of the present disclosure.

FIG. 7 is a block diagram illustrating a base station 105a and UE 115a configured according to one aspect of the present disclosure. The information indication field 701 may also take the form of a single number identifier which identifies the total number of CBG transmission indication fields will be included in transmission indication signal 70. Thus, TB NDI field 700 includes the TB-level NDIs for each of the multiple TTIs of the transmission. Information indication field 701 with a value of '2' indicates that transmission indication signal 70 will include two CBG transmission indication fields, CBG transmission indication field 702 for TTI A and CBG transmission indication field 703 for TTI B. The unused bits of the predetermined payload size of transmission indication signal 70 are occupied by zero padding 704.

Figure 8:
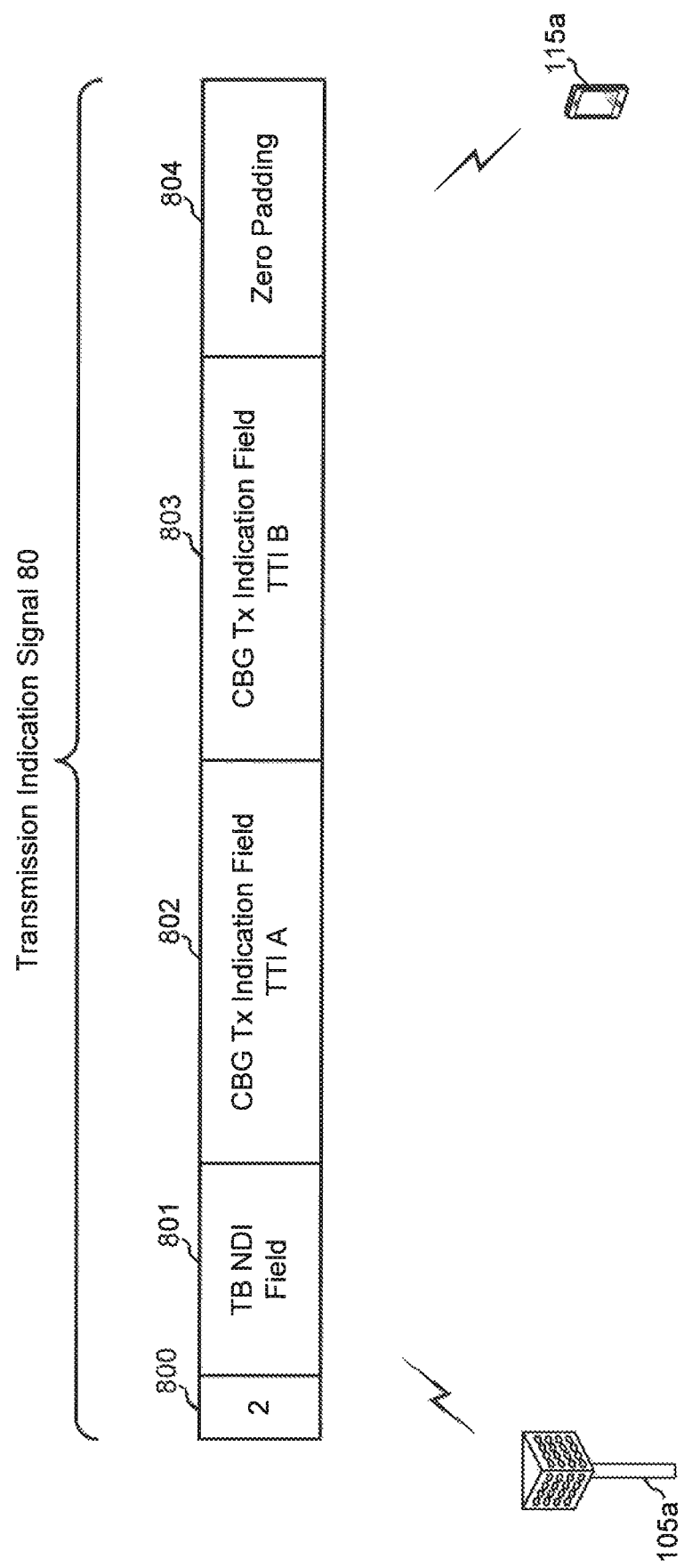
FIG. 8 is a block diagram illustrating a base station and UE configured according to one aspect of the present disclosure.

FIG. 8 is a block diagram illustrating a base station 105a and UE 115a configured according to one aspect of the present disclosure. Transmission indication signal 80, as generated by base station 105a includes information indication field 800, TB NDI field 801, CBG transmission indication field 802 for TTI A, CBG transmission indication field 803 for TTI B, and zero padding 804. In generating the TD-level NDI for TD NDI field 801, base station 105a may skip the TB-level NDIs for TTIs A and B, for which CBG transmission indications have been included in CBG transmission indication field 802 and 803. Thus, payload may be conserved in this manner. However, with a variable size for TB NDI field 801, information indication field 800 including the identification of the number of CBG transmission indication fields to be included in transmission indication signal 80 may be placed at the beginning in order to allow for such skipped TB-level NDIs.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The functional blocks and modules in FIG. 5 may comprise processors, electronics devices, hardware devices, electronics components, logical circuits, memories, software codes, firmware codes, etc., or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. Computer-readable storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, a connection may be properly termed a computer-readable medium. For example, if the software is transmitted from a website, server, or other remote source using a coaxial cable, fiber optic cable, twisted pair, or digital subscriber line (DSL), then the coaxial cable, fiber optic cable, twisted pair, or DSL, are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C) or any of these in any combination thereof.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method of wireless communication, comprising:
establishing, at a base station, a communication link with a served user equipment (UE), wherein the communication link includes configuration for code block group (CBG)-level transmission and a single grant is configurable to carry assignment for a plurality of transmission time intervals (TTIs);
preparing, by the base station, a transmission indication signal of predetermined length for the served UE including one of: a transmission grant or a retransmission grant for each of the plurality of TTIs, wherein the transmission indication signal includes for each TTI of the plurality of TTIs one or both of: a transport block (TB)-level new data indicator (NDI) or a CBG transmission indication; and
transmitting the transmission indication signal to the served UE.

2. The method of claim 1, wherein the preparing includes:
determining, by the base station, available space within the predetermined length of the transmission indication signal; and
generating, by the base station, only TB-level NDI for each TTI in response to the available space being less than a threshold size.

3. The method of claim 1, wherein the preparing includes:
determining, by the base station, available space within the predetermined length of the transmission indication signal; and
in response to the available space exceeding a threshold size:
generating, by the base station, one or more TB-level NDI for each TTI of the plurality of TTIs;
identifying, by the base station, one or more of the plurality of TTIs configured for CBG-level transmission for the CBG transmission indication; and
generating, by the base station, one or more CBG transmission indications associated with the identified one or more of the plurality of TTIs; and
adding, by the base station, a TTI index to the transmission indication signal for each TTI of the plurality of TTIs for which the one or more CBG transmission indications is included in the transmission indication signal.

4. The method of claim 3, further including:
concatenating, by the base station, two or more CBG transmission indications of the one or more CBG transmission indications in the transmission indication signal up to the predetermined length.

5. The method of claim 4, further including:
providing, by the base station, identification information in the transmission indication signal, wherein the identification information identifies a bit field in the transmission indication signal for the two or more CBG transmission indications.

6. The method of claim 5, wherein the identification information includes one of:
a single number identifier for the transmission indication signal identifying a total number of the two or more CBG transmission indications in the bit field; or
a field identifier for each of the two or more CBG transmission indications signaling a next field as the bit field for the each of the two or more CBG transmission indications.

7. The method of claim 3, wherein the identifying the one or more of the plurality of TTIs includes:

identifying each TTI of the plurality of TTIs configured for CBG-level transmission;
determining a type of interference experienced on the each TTI, wherein the one or more of the plurality of TTIs identified for the CBG transmission indication are determined as experiencing one of: a bursty type of interference or fewer failed CBG transmissions.

8. The method of claim 3, further including:
refraining, by the base station, from including one or more of the one or more TD-level NDIs corresponding to the one or more of the plurality of TTIs associated with the one or more CBG transmission indications.

9. The method of claim 1, further including:
determining, by the base station, unused bits of the predetermined length of the transmission indication signal after including all the TB-level NDI, the CBG transmission indication, and the TTI index for the transmission indication signal; and
adding, by the base station, padding for the unused bits.

10. An apparatus configured for wireless communication, comprising:
means for establishing, at a base station, a communication link with a served user equipment (UE), wherein the communication includes configuration for code block group (CBG)-level transmission and a single grant may carry assignment for a plurality of transmission time intervals (TTIs);
means for preparing, by the base station, a transmission indication signal of predetermined length for the served UE including one of: a transmission grant or a retransmission grant for each of the plurality of TTIs, wherein the transmission indication signal includes for each TTI of the plurality of TTIs one or both of: a transport block (TB)-level new data indicator (NDI) or a CBG transmission indication; and
means for transmitting the transmission indication signal to the served UE.

11. The apparatus of claim 10, wherein the means for preparing includes:
means for determining, by the base station, available space within the predetermined length of the transmission indication signal; and
means for generating, by the base station, only TB-level NDI for each TTI in response to the available space being less than a threshold size.

12. The apparatus of claim 10, wherein the means for preparing includes:
means for determining, by the base station, available space within the predetermined length of the transmission indication signal; and
in response to the available space exceeding a threshold size:
means for generating, by the base station, one or more TB-level NDI for each TTI of the plurality of TTIs;
means for identifying, by the base station, one or more of the plurality of TTIs configured for CBG-level transmission for the CBG transmission indication; and
means for generating, by the base station, one or more CBG transmission indications associated with the one or more of the plurality of TTIs; and
means for adding, by the base station, a TTI index to the transmission indication signal for each of the one or more of the plurality of TTIs for which the one or more CBG transmission indications is included in the transmission indication signal.

13. The apparatus of claim 12, further including:
means for concatenating, by the base station, two or more CBG transmission indications of the one or more CBG transmission indications in the transmission indication signal up to the predetermined length.

14. The apparatus of claim 13, further including:
means for providing, by the base station, identification information in the transmission indication signal, wherein the identification information identifies a bit field in the transmission indication signal for the two or more CBG transmission indications.

15. The apparatus of claim 14, wherein the identification information includes one of:
a single number identifier for the transmission indication signal identifying a total number of the two or more CBG transmission indications in the bit field; or
a field identifier for each of the two or more CBG transmission indications signaling a next field as the bit field for the each of the two or more CBG transmission indications.

16. The apparatus of claim 12, wherein the means for identifying the one or more of the plurality of TTIs includes:
means for identifying each TTI of the plurality of TTIs configured for CBG-level transmission;
means for determining a type of interference experienced on the each TTI, wherein the one or more of the plurality of TTIs identified for the CBG transmission indication are determined as experiencing one of: a bursty type of interference or fewer failed CBG transmissions.

17. The apparatus of claim 12, further including:
means for refraining, by the base station, from including one or more of the one or more TD-level NDIs corresponding to the one or more of the plurality of TTIs associated with the one or more CBG transmission indications.

18. The apparatus of claim 10, further including:
means for determining, by the base station, unused bits of the predetermined length of the transmission indication signal after including all the TB-level NDI, the CBG transmission indication, and the TTI index for the transmission indication signal; and
means for adding, by the base station, padding for the unused bits.

19. A non-transitory computer-readable medium having program code recorded thereon, the program code comprising:
program code executable by a computer for causing the computer to establish, at a base station, a communication link with a served user equipment (UE), wherein the communication includes configuration for code block group (CBG)-level transmission and a single grant may carry assignment for a plurality of transmission time intervals (TTIs);
program code executable by the computer for causing the computer to prepare, by the base station, a transmission indication signal of predetermined length for the served UE including one of: a transmission grant or a retransmission grant for each of the plurality of TTIs, wherein the transmission indication signal includes for each TTI of the plurality of TTIs one or both of: a transport block (TB)-level new data indicator (NDI) or a CBG transmission indication; and
program code executable by the computer for causing the computer to transmit the transmission indication signal to the served UE.

20. The non-transitory computer-readable medium of claim 19, wherein the program code executable by the computer for causing the computer to prepare includes:
program code executable by the computer for causing the computer to determine, by the base station, available space within the predetermined length of the transmission indication signal; and
program code executable by the computer for causing the computer to generate, by the base station, only TB-level NDI for each TTI in response to the available space being less than a threshold size.

21. The non-transitory computer-readable medium of claim 19, wherein the program code executable by the computer for causing the computer to prepare includes:
program code executable by the computer for causing the computer to determine, by the base station, available space within the predetermined length of the transmission indication signal; and
executable in response to the available space exceeding a threshold size:
program code executable by the computer for causing the computer to generate, by the base station, one or more TB-level NDI for each TTI of the plurality of TTIs;
program code executable by the computer for causing the computer to identify, by the base station, one or more of the plurality of TTIs configured for CBG-level transmission for the CBG transmission indication; and
program code executable by the computer for causing the computer to generate, by the base station, one or more CBG transmission indications associated with the one or more of the plurality of TTIs; and
program code executable by the computer for causing the computer to add, by the base station, a TTI index to the transmission indication signal for each TTI of the plurality of TTIs for which the one or more CBG transmission indications is included in the transmission indication signal.

22. The non-transitory computer-readable medium of claim 19, further including:
program code executable by the computer for causing the computer to determine, by the base station, unused bits of the predetermined length of the transmission indication signal after including all the TB-level NDI, the CBG transmission indication, and the TTI index for the transmission indication signal; and
program code executable by the computer for causing the computer to add, by the base station, padding for the unused bits.

23. An apparatus configured for wireless communication, the apparatus comprising:
at least one processor; and
a memory coupled to the at least one processor,
wherein the at least one processor is configured:
to establish, at a base station, a communication link with a served user equipment (UE), wherein the communication includes configuration for code block group (CBG)-level transmission and a single grant may carry assignment for a plurality of transmission time intervals (TTIs);
to prepare, by the base station, a transmission indication signal of predetermined length for the served UE including one of: a transmission grant or a retransmission grant for each of the plurality of TTIs, wherein the transmission indication signal includes for each TTI of the plurality of TTIs one or both of:
a transport block (TB)-level new data indicator (NDI) or a CBG transmission indication; and
to transmit the transmission indication signal to the served UE.

24. The apparatus of claim 23, wherein the configuration of the at least one processor to prepare includes configuration of the at least one processor:
to determine, by the base station, available space within the predetermined length of the transmission indication signal; and
to generate, by the base station, only TB-level NDI for each TTI in response to the available space being less than a threshold size.

25. The apparatus of claim 23, wherein the configuration of the at least one processor to prepare includes configuration of the at least one processor:
to determine, by the base station, available space within the predetermined length of the transmission indication signal; and
executable in response to the available space exceeding a threshold size:
to generate, by the base station, one or more TB-level NDI for each of the plurality of TTIs;
to identify, by the base station, one or more of the plurality of TTIs configured for CBG-level transmission for the CBG transmission indication; and
to generate, by the base station, one or more CBG transmission indications associated with the one or more of the plurality of TTIs; and
to add, by the base station, a TTI index to the transmission indication signal for each of the plurality of TTIs for which the one or more CBG transmission indications is included in the transmission indication signal.

26. The apparatus of claim 25, further including:
program code executable by the computer for causing the computer to concatenate, by the base station, two or more CBG transmission indications of the one or more CBG transmission indications in the transmission indication signal up to the predetermined length.

27. The apparatus of claim 26, further including configuration of the at least one processor to provide, by the base station, identification information in the transmission indication signal, wherein the identification information identifies a bit field in the transmission indication signal for the two or more CBG transmission indications.

28. The apparatus of claim 25, wherein the configuration of the at least one processor to identify the one or more of the plurality of TTIs includes configuration of the at least one processor:
to identify each TTI of the plurality of TTIs configured for CBG-level transmission;
to determine a type of interference experienced on the each TTI, wherein the one or more of the plurality of TTIs identified for the CBG transmission indication are determined as experiencing one of: a bursty type of interference or fewer failed CBG transmissions.

29. The apparatus of claim 25, further including configuration of the at least one processor to refrain, by the base station, from including one or more of the one or more TD-level NDIs corresponding to the one or more of the plurality of TTIs associated with the one or more CBG transmission indications.

30. The apparatus of claim 23, further including configuration of the at least one processor:
to determine, by the base station, unused bits of the predetermined length of the transmission indication signal after including all the TB-level NDI, the CBG transmission indication, and the TTI index for the transmission indication signal; and to add, by the base station, padding for the unused bits.

* * * * *